(12) United States Patent
Liu et al.

(10) Patent No.: US 8,028,913 B2
(45) Date of Patent: Oct. 4, 2011

(54) ARRANGEMENT FOR AND METHOD OF UNIFORMLY ILLUMINATING DIRECT PART MARKINGS TO BE IMAGED AND ELECTRO-OPTICALLY READ

(75) Inventors: Rong Liu, Selden, NY (US); Mark Drzymala, Commack, NY (US); Eugene Joseph, Coram, NY (US); Roland W. F. Lee, Flushing, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 706 days.

(21) Appl. No.: 11/906,092

(22) Filed: Sep. 28, 2007

(65) Prior Publication Data

US 2009/0084848 A1     Apr. 2, 2009

(51) Int. Cl.
*G06K 7/10*     (2006.01)
(52) U.S. Cl. ........................................ 235/455
(58) Field of Classification Search .................. 235/454, 235/455, 472.01, 462.32, 462.42
See application file for complete search history.

(56) References Cited

U.S. PATENT DOCUMENTS

| | | | |
|---|---|---|---|
| 6,341,878 B1 | 1/2002 | Chiang | |
| 7,083,097 B2* | 8/2006 | Toyama et al. | 235/454 |
| 7,201,321 B2 | 4/2007 | He et al. | |
| 2005/0011956 A1 | 1/2005 | Carlson | |
| 2005/0194447 A1 | 9/2005 | He et al. | |
| 2006/0175409 A1 | 8/2006 | Reichenbach et al. | |
| 2008/0142604 A1* | 6/2008 | Nunnink | 235/473 |

FOREIGN PATENT DOCUMENTS

JP     2005/025311 A     1/2005

OTHER PUBLICATIONS

International Search Report and the Written Opinion of the International Searching Authority for International Application No. PCT/US2008/077829, mailed Jan. 30, 2009.

* cited by examiner

*Primary Examiner* — Seung Lee
(74) *Attorney, Agent, or Firm* — Nonggiang Fan

(57) ABSTRACT

Performance of an imaging reader for electro-optically reading direct part markings on workpieces is enhanced by uniformly illuminating the markings. An illuminator is operative for emitting illumination light of greater and lesser intensity toward the indicia. A diffuser is operative for diffusing the illumination light en route to the indicia. The diffuser includes a plurality of diffusing elements adjacent the illuminator for diffusing the illumination light of greater intensity more than the illumination light of lesser intensity.

16 Claims, 4 Drawing Sheets

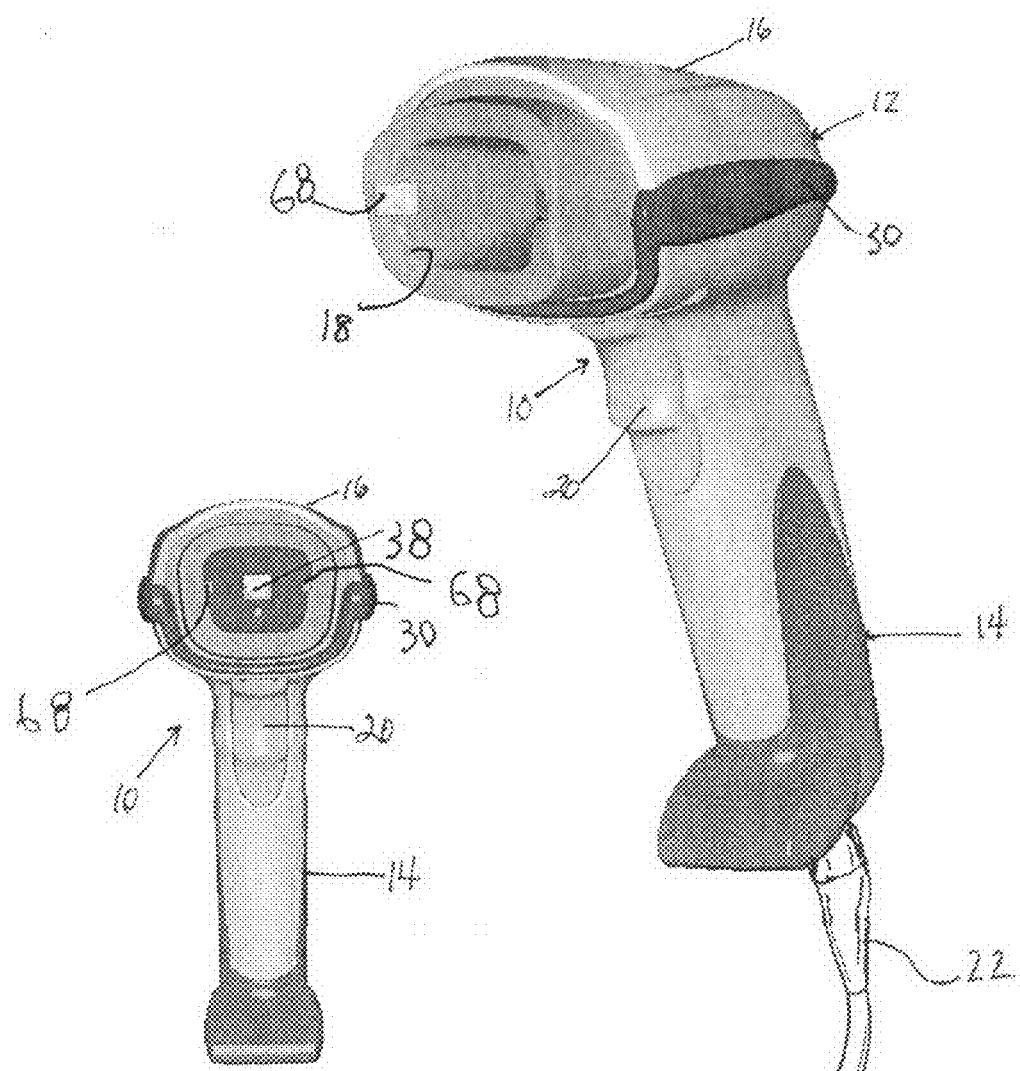
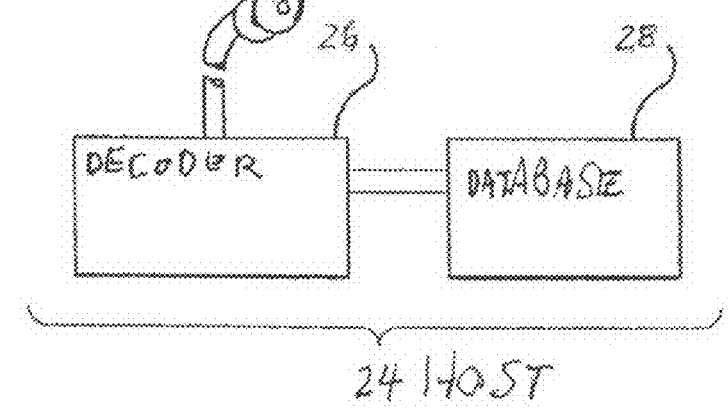
FIG. 2
FIG. 1

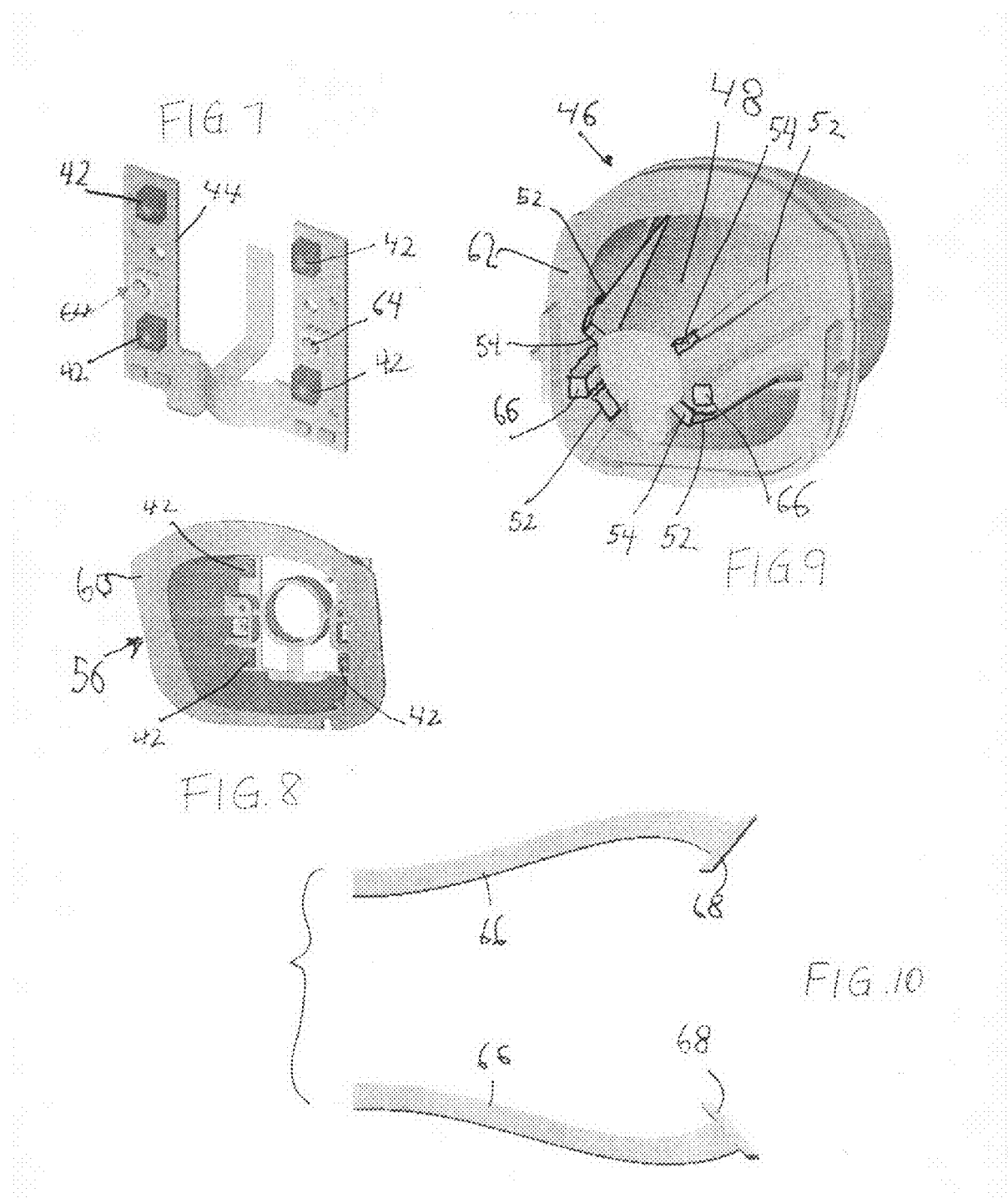

ARRANGEMENT FOR AND METHOD OF UNIFORMLY ILLUMINATING DIRECT PART MARKINGS TO BE IMAGED AND ELECTRO-OPTICALLY READ

BACKGROUND OF THE INVENTION

Direct part marking (DPM) allows workpieces to be directly marked, identified and traced to their origin, and its use is growing in the automotive, aerospace, electronics, medical equipment, tooling, and metalworking industries, among many others. Despite the ability to control very tight specifications on element size, width, spacing and so on, the lack of sharp contrast of machine-readable optical DPM codes directly marked on metal, plastic, leather, glass, etc., workpieces prevents traditional moving laser beam readers from electro-optically reading the DPM codes reliably. These moving beam readers emit a laser beam, which reflects off the highly reflective, typically non-planar, metal or glass, workpieces as bright light.

To counter a variety of problems, such as lack of contrast, difficulty of maintaining precise element specifications, limited available marking areas, and a large amount of data to be encoded, the art proposed the use of matrix codes, especially the DataMatrix code, which reduces the required marking element size, precision and area, as well as contrast so that markings are able to be directly made on parts with, for example, steel or aluminum surfaces, and also proposed the use of imaging readers, for example, as disclosed in U.S. Pat. No. 7,201,321, which use solid-state arrays or imagers similar to those used in digital cameras to capture an image of the marking. A microprocessor is used to analyze and decode the captured image of the matrix code.

Yet, the use of imaging readers, especially handheld readers, for reading marked workpieces has proven to be challenging. Contrast is still often less than desirable. Ambient lighting conditions are variable. Illumination from on-board illuminators or illumination light sources is directed at variable angles. Reflections from ambient light sources and illumination light sources often appear in the field of view of the reader as hot spots, glare, or specular reflections of intense, bright light that saturate the imagers, thereby degrading reading performance. Unlike machine-readable codes printed in one color (for example, black) on paper of another color (for example, white), DPM codes are typically difficult for a human operator to even find on the workpieces, which often have complicated, i.e., non-planar, shapes to further complicate finding the DPM code and aiming the reader directly at the DPM code for reading.

Bulk diffusers are commonly used to evenly spread and diffuse illumination light to minimize such hot spots, glare, and specular reflections. However, the level of diffusion is inversely proportional to light transmission. Hence, it would be extremely inefficient to only use highly diffusive material. Moreover, since the illumination light sources are usually placed close to the diffuser, it is difficult to eliminate hot spots on the diffuser. The hot spots become significantly worse when decoding DPM codes on a reflective, curved surface. Therefore, it is desirable and yet challenging to eliminate hot spots while maintaining maximum light throughput and providing uniform background illumination for the DPM code of interest.

In U.S. Pat. No. 6,341,878, a bulk diffuser is used in conjunction with a rear-diffused reflector to eliminate hot spots in a DPM imaging reader. The main disadvantage with this reader is that it requires extremely bright light sources and has a low light throughput. Another shortcoming is that since all the illumination light is reflected off a diffused reflector, a uniform illumination across the diffuser is not provided. In addition, since the light sources are facing toward the imager, an all-enclosed baffling structure is necessary to eliminate stray light.

SUMMARY OF THE INVENTION

In keeping with the above objects and others, which will become apparent hereinafter, one feature of the present invention resides, briefly stated, in a method of, and an arrangement for, uniformly illuminating indicia to be imaged and electro-optically read, especially direct part marking (DPM) codes on workpieces. An illuminator, including a single illumination light source or a plurality of illumination light sources, is operative for emitting illumination light of greater and lesser intensity toward the indicia. A diffuser is operative for diffusing the illumination light en route to the indicia. The diffuser includes a plurality of diffusing elements adjacent the illuminator for diffusing the illumination light of greater intensity more than the illumination light of lesser intensity, thereby minimizing hot spots, glare and specular reflections and rendering the illumination light more uniform across the indicia.

The arrangement includes a solid-state imager having an optical axis, for capturing light over a field of view from the indicia. The illumination light sources are preferably spaced apart from one another and are preferably, but not necessarily, arranged symmetrically about the optical axis. The illumination light sources and the imager directly face the indicia in a forward direction toward the indicia. The illumination light sources are located downstream of the imager along the forward direction. Each illumination light source has a source axis along which the illumination light of greater intensity is emitted, and each diffusing element is preferably elongated and has an end face adjacent a respective illumination light source. The illumination light of greater intensity along the source axis enters the respective diffusing element via its end face. Preferably, each source axis is generally parallel to the optical axis.

In a preferred embodiment, each diffusing element has a tapered cross-section that decreases in height or thickness in a direction away from the end face of a respective diffusing element toward the indicia. The diffuser includes a frustoconical portion having an exterior surface, and the diffusing elements are integral with the diffuser, preferably by being molded therewith, and are raised relative to the exterior surface. A light baffle surrounds the illumination light sources and the frustoconical portion, for reflecting the illumination light of lesser intensity from the illumination light sources to the diffuser. The diffuser preferably has a textured surface of increased density in regions closer to the illumination light sources for scattering the illumination light. These measures also assist in rendering the illumination light more uniform across the indicia.

In accordance with another feature of this invention, an auxiliary illuminator, including a single auxiliary light source, or a plurality of auxiliary light sources, is operative for emitting auxiliary illumination light; and a plurality of lightpipes having diffusing end faces, is operative for guiding the auxiliary illumination light away from the auxiliary illuminator to the diffusing end faces for diffusing the auxiliary illumination light en route to the indicia.

Still another feature of this invention resides in mounting a boot on the diffuser. A locating recess on the boot is operative for receiving a reflective workpiece having a direct part marking (DPM) code thereon as the indicia. The boot has projections extending past the diffuser and the workpiece to reflect the illumination light reflected off the diffuser and serve as a background contrast for the DPM.

Yet another feature of this invention resides in a method of uniformly illuminating indicia to be imaged and electro-optically read. The method includes the steps of emitting illumination light of greater and lesser intensity toward the indicia with the illuminator; and diffusing the illumination light en route to the indicia with a plurality of diffusing elements adjacent the illuminator for diffusing the illumination light of greater intensity more than the illumination light of lesser intensity.

Thus, the present invention proposes a volume diffuser with localized thickness variations and surface textures, both of which minimize hot spots, glare and specular reflections, thereby providing uniform background illumination for the indicia, such as DPM codes on reflective surfaces of workpieces. The thickness of the diffuser is varied according to the intensity profile of the illumination light sources. Similarly, surface textures are integrated with the diffuser surface to scatter hot spots along preferred directions. All the light sources face away from the imager. This eliminates the secondary rear-diffused reflector taught by the prior art and gives less baffling constraints. This also reduces the need for very bright light sources and allows for a higher light throughput.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a handheld imaging reader for electro-optically reading indicia by image capture and equipped with an arrangement for uniformly illuminating the indicia in accordance with this invention;

FIG. 2 is a front elevational view on a reduced scale of the reader of FIG. 1;

FIG. 7 is a perspective view of an illumination light subassembly shown in FIG. 4;

FIG. 8 is a perspective view of the illumination light subassembly of FIG. 7 as seen from inside a baffle shown in FIG. 4;

FIG. 9 is a rear perspective view of a diffuser shown in FIG. 4; and

FIG. 10 is a top plan view of a pair of lightpipes shown in FIG. 4, but in isolation.

DETAILED DESCRIPTION OF THE PREFERRED EMBODIMENTS

Figure 3:
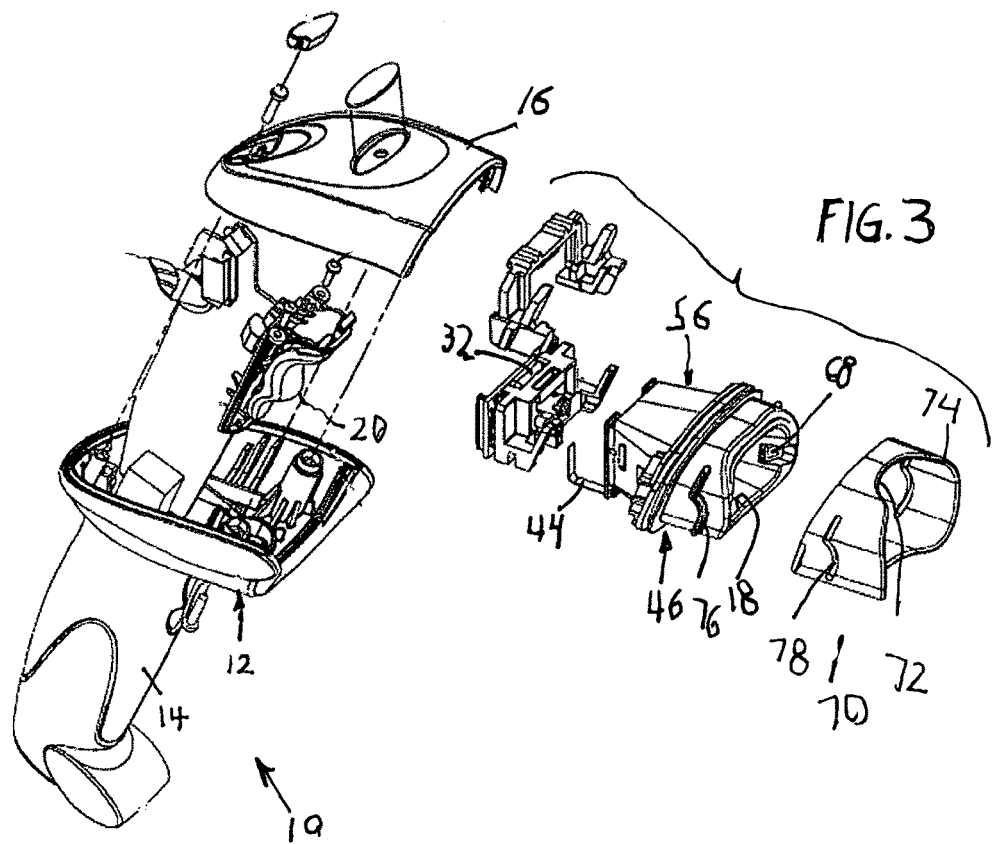
FIG. 3 is a perspective, exploded view of a reader analogous to that shown in FIG. 1, depicting various components thereof.
Figure 4:
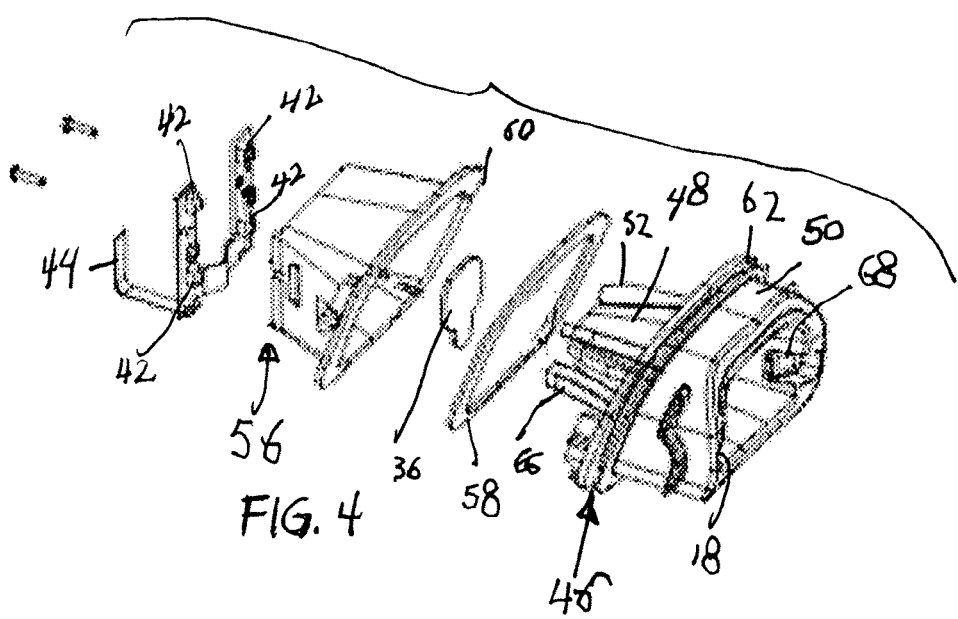
FIG. 4 is a perspective, exploded view of some of the components of FIG. 3.

Reference numeral 10 in FIG. 1 generally identifies a handheld, portable imaging reader for electro-optically reading indicia, such as DPM codes on workpieces. The reader 10 includes a housing 12 in which various aiming, illuminating, and image capture systems, as described below, are incorporated. The housing 12 includes a generally elongated handle or lower handgrip portion 14 and a barrel or upper body portion 16 having a front end region at which an open face 18 is located. The cross-sectional dimensions and overall size of the handle 14 are such that the reader can conveniently be held in a user's hand. The body and handle portions may be constructed of a lightweight, resilient, shock-resistant, self-supporting material such as a synthetic plastic material. The plastic housing may be injection molded, but can be vacuum-formed or blow-molded to form a thin hollow shell which bounds an interior space whose volume is sufficient to contain the various systems of this invention. An overmold 30 of a resilient, shock-absorbing material, such as rubber, is exteriorly molded at various regions over the housing for shock protection.

A manually actuatable trigger 20 is mounted in a moving relationship on the handle 14 in a forward facing region of the reader. The user's forefinger is normally used to actuate the reader by depressing the trigger. A flexible electrical cable 22 may be provided to connect the reader to remote components of the code reading system. In alternative embodiments, the cable may also provide electrical power to the systems within the reader. In preferred embodiments, the cable 22 is connected to a host 24 that receives decoded data from the reader. In alternative embodiments, a decode module 26 may be provided exteriorly to the reader. In such an embodiment, decoded data from the decode module 26 may be transmitted to further host processing equipment and databases represented generally by box 28. If the cable 22 is not used, then a wireless link to transfer data may be provided between the reader 10 and the host 24, and an on-board battery, typically within the handle, can be used to supply electrical power.

An alternative embodiment incorporates a display and a keyboard, and optionally a wireless transceiver, preferably with an on-board decoder. The decoded data is then either transferred to a remote host computer in real time, or saved to an internal memory such that the stored data can be transferred to a host computer at a later time in batch mode, when the reader is physically connected to such a connected host computer.

Figure 5:
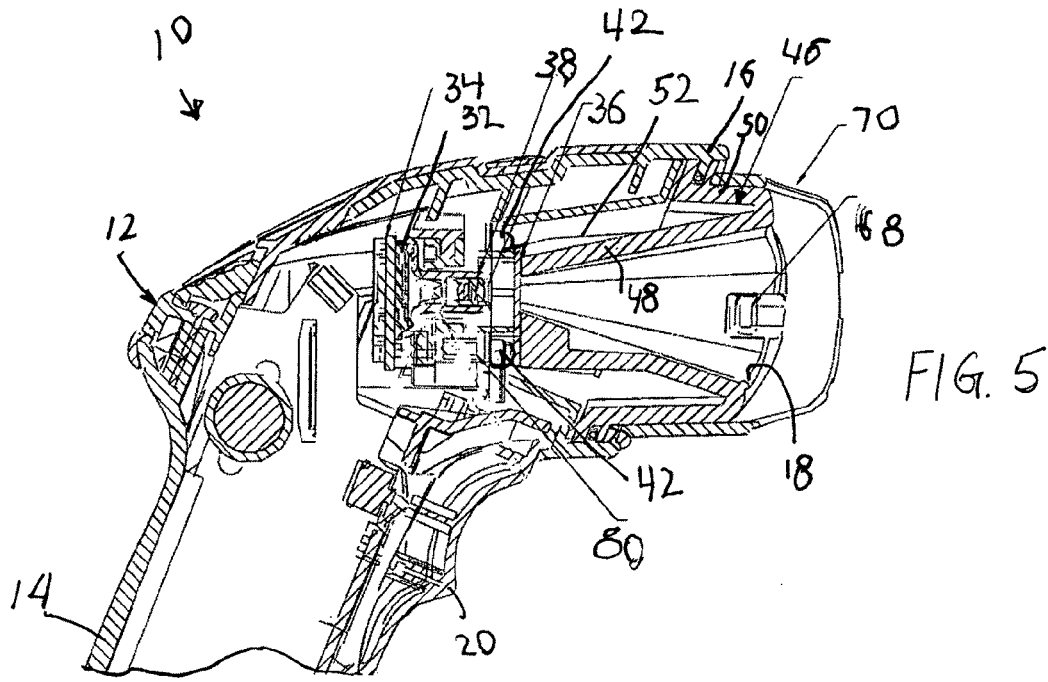
FIG. 5 is a broken-away, side sectional view of the reader of FIG. 3 in an assembled state.
Figure 6:
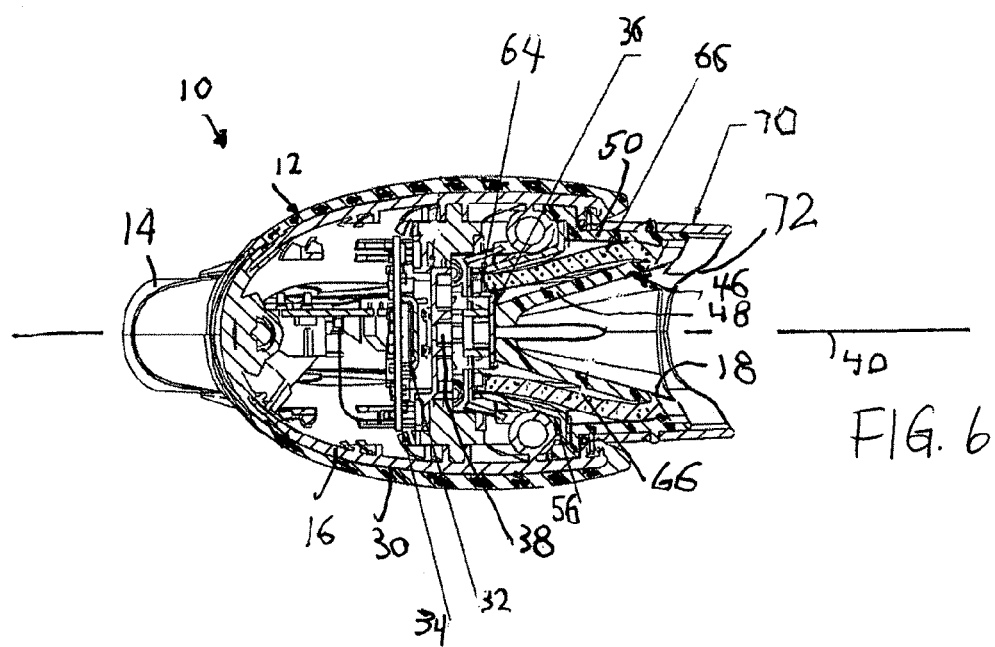
FIG. 6 is a sectional plan view of the reader of FIG. 3 in an assembled state.

A solid-state imager 32, as shown in FIGS. 3, 5, and 6, is mounted within the housing 12 on a printed circuit board 34 and preferably is a two-dimensional, charge coupled device (CCD) or a complementary metal oxide semiconductor (CMOS) array of cells or sensors operative for capturing light over its field of view from the DPM code through the open face 18, through a light-transmissive window 36 to seal the housing from entry of contaminants, and through an imaging lens assembly 38 for delivery to the sensors. The sensors produce electrical signals corresponding to a two-dimensional array of pixel information for an image of the DPM code. The imager 32 and lens assembly 38 are aligned along a centerline or an optical axis 40 (see FIG. 6) generally centrally located within the body portion 16.

The lens assembly 38 has a fixed focus and enables image capture over a range of working distances between a close-in distance and a far-out distance relative to the window 36. The imager and lens assembly are capable of acquiring a full image of the DPM code in lighting conditions from two lux to direct sunlight. Exposure time is about 15 milliseconds. Resolution of the array can be of various sizes although megapixel resolution is preferred.

According to this invention, an illuminator is provided to provide an illumination field for the imager 32. The illuminator preferably constitutes a single illumination light source, or a plurality of illumination light sources, e.g., light emitting diodes (LEDs) 42, energized by power supply lines in the cable 22, or via the on-board battery. As shown in FIG. 7, the LEDs 42 are mounted on a common support 44, are spaced apart from one another and are preferably, but not necessarily, arranged symmetrically about the optical axis 40. Although four LEDs 42 are shown, more or less than four LEDs could be employed.

Each LED 42 is operative for emitting illumination light of greater and lesser intensity toward the indicia. More specifically, each LED 42 acts as a point source and emits the illumination light into a generally conical spatial field having a source axis. The illumination light of each LED 42 has its greatest intensity on the source axis, and its intensity proportionately falls off angularly away from and off the source axis. Preferably, each source axis is generally parallel to the optical axis 40. The illumination light sources 42 and the imager 32 directly face the indicia in a forward direction toward the indicia. The illumination light sources 42 are located downstream of the imager 32 along the forward direction. If a single LED 42 is used, then its emitted illumination light can be split into multiple light sources.

A diffuser 46 is operative for diffusing the illumination light en route to the indicia. The diffuser 46 includes a rear frustoconical portion 48 having an exterior surface, a hollow, front tubular portion 50, and a plurality of diffusing elements 52 (see FIG. 9) adjacent the illumination light sources 42, one diffusing element 52 for each light source 42, for diffusing the on-axis illumination light of greater intensity more than the off-axis illumination light of lesser intensity, thereby minimizing hot spots, glare and specular reflections and rendering the illumination light more uniform across the indicia. The diffuser 46 preferably has a textured surface of increased density in regions closer to the illumination light sources 42 for scattering the illumination light.

Each diffusing element 52 is preferably elongated and has an end face 54 closely adjacent and confronting a respective illumination light source 42. The on-axis illumination light of greater intensity enters the respective diffusing element 52 via its end face 54, and travels along the respective diffusing element 5, and passes through the diffuser, which is constituted of a light-transmissive, diffusing material. In a preferred embodiment, each diffusing element 52 has a tapered cross-section that decreases in height or thickness in a direction away from the end face 54 of a respective diffusing element toward the indicia. The diffusing elements 52 are integral with the diffuser, preferably by being molded therewith, and are raised relative to the exterior surface.

An annular, curved, light baffle 56 surrounds the illumination light sources 42 and the frustoconical portion 48, and is constituted of a matte, reflective material for reflecting the off-axis illumination light of lesser intensity from the illumination light sources 42 to the diffuser 46. This measure also assists in rendering the illumination light more uniform across the indicia. The side emissions of the LEDs 42 are reflected toward the diffuser by the curved baffle to increase light throughput. The baffle 56 is an enclosure sealed against entry of ambient light and against escape of the illumination light with the aid of a gasket 58 sandwiched between an annular flange 60 on the baffle 56 and an annular flange 62 on the tubular portion 50 of the diffuser 46.

In accordance with another feature of this invention, an auxiliary illuminator including one auxiliary light source, or a plurality of auxiliary light sources 64 (see FIG. 7) is mounted on the common support 44 and is operative for emitting auxiliary illumination light. A plurality of lightpipes 66 (see FIG. 10) each has an input face in close, confronting relationship with a respective auxiliary light source 64, as well as an opposite, diffusing output end face 68. The lightpipes 66 are operative for guiding the auxiliary illumination light away from the auxiliary light sources 64 to the diffusing end faces 68 for diffusing the auxiliary illumination light en route to the indicia. As shown in FIG. 9, the lightpipes 66 straddle the frustoconical portion 48 and extend through the diffuser until the end faces 68 are exposed at the open face.

Still another feature of this invention resides in mounting a boot 70 on the diffuser 46. A locating recess 72 (see FIG. 3) on the boot 70 is operative for receiving a reflective workpiece having a direct part marking (DPM) code thereon as the indicia. In a preferred embodiment, the workpiece is a cylindrical, hollow, surgical tube. The boot 70 has projections 74 extending past the diffuser and the workpiece to reflect the illumination light reflected off the diffuser and serve as a background contrast for the DPM code. Preferably, the boot is constituted of a white-colored material. The boot is mounted with a snap-type action by generally S-shaped locking ridges 76 on the diffuser which extend through complementary S-shaped locking apertures 78 on the boot.

Yet another feature of this invention resides in a method of uniformly illuminating indicia to be imaged and electro-optically read. The method includes the steps of emitting illumination light of greater and lesser intensity toward the indicia with an illuminator, e.g., the illumination light sources 42; and diffusing the illumination light en route to the indicia with a plurality of diffusing elements 52 adjacent the illumination light sources 42 for diffusing the illumination light of greater intensity more than the illumination light of lesser intensity.

Thus, the present invention proposes a volume or bulk diffuser 46 with localized thickness variations, i.e., the diffuser elements 52, and surface textures, both of which minimize hot spots, glare and specular reflections, thereby providing uniform background illumination for the indicia, such as DPM codes on reflective surfaces of workpieces. The thickness of the diffuser is varied according to the intensity profile of the illumination light sources 42. The regions on the diffuser that are closer to the illumination light sources 42 and, hence, receive the on-axis illumination light, are thicker to provide more light diffusion, and the thickness falls off as the on-axis illumination light propagates towards the open face. The baffle serves to increase the throughput of the off-axis light. Similarly, surface textures are integrated with the diffuser surface to scatter hot spots along preferred directions. The textures on the surfaces closer to the illumination light sources 42 are denser and become less dense near the open face. Since surface textures and diffusers share the very similar purpose that they both scatter light, a less translucent material can be used with surface textures.

The use of diffuser thicknesses and surface textures described herein is compatible with existing molding techniques. Some implications are that texture variations on the surfaces would not be gradual; for example, there would be distinct extremely dense textures on the surfaces closer to the light sources 42 at one end of the diffuser, followed by less dense textures in the middle of the diffuser, and then followed by light density textures at the opposite end of the diffuser. Another implication is that the diffuser thickness is tapered and therefore is designed to also satisfy a molding draft angle so that the diffuser can be easily pulled out of its mold.

In use, once the trigger 20 is depressed to initiate decoding, an aiming light projector 80, preferably including a laser, is directed at the workpiece, and the handheld reader 10 is moved toward or away from the workpiece until an aiming light is visible on the workpiece. If the boot 70 is used, then the workpiece is automatically correctly located. The aiming projector 80 is turned off during image capture, a necessary step in decoding DPM codes.

It will be understood that each of the elements described above, or two or more together, also may find a useful application in other types of constructions differing from the types described above.

While the invention has been illustrated and described as embodied in an imaging reader for electro-optically reading DPM codes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for uniformly illuminating indicia to be imaged and electro-optically read, comprising:
    a solid-state imager having an optical axis, for capturing light over a field of view from the indicia;
    an illuminator for emitting illumination light, according to an intensity profile, toward the indicia;
    a diffuser for diffusing the illumination light en route to the indicia, the diffuser including a plurality of diffusing elements adjacent the illuminator; and
    wherein the illuminator includes a plurality of illumination light sources spaced apart from one another; and
    wherein each illumination light source has a source axis along which the illumination light of greater intensity is emitted, and wherein each diffusing element made of diffusing material is elongated and has an end face adjacent a respective illumination light source and through which the illumination light of greater intensity along the source axis enters the respective diffusing element.

2. The arrangement of claim 1, wherein each diffusing element has a thickness that decreases in size in a direction away from the end face of a respective diffusing element toward the indicia.

3. The arrangement of claim 1, and a light baffle surrounding the illuminator, for reflecting the illumination light of lesser intensity from the illuminator to the diffuser.

4. The arrangement of claim 1, and an auxiliary illuminator for emitting auxiliary illumination light; and a plurality of lightpipes having diffusing end faces, for guiding the auxiliary illumination light away from the auxiliary illuminator to the diffusing end faces for diffusing the auxiliary illumination light en route to the indicia.

5. The arrangement of claim 1, wherein the illumination light sources and the imager both directly face the indicia in a forward direction toward the indicia, and wherein the illumination light sources are located downstream of the imager along the forward direction.

6. The arrangement of claim 1, wherein the diffuser has a textured surface of increased density in regions closer to the illuminator for scattering the illumination light.

7. The arrangement of claim 1, and a boot mounted on the diffuser and having a locating recess for receiving a reflective workpiece having a direct part marking (DPM) thereon as the indicia, and wherein the boot has projections extending past the diffuser and the workpiece to reflect the illumination light reflected off the diffuser and serve as a background contrast for the DPM.

8. An arrangement for uniformly illuminating indicia to be imaged and electro-optically read, comprising:
    a solid-state imager having an optical axis, for capturing light over a field of view from the indicia;
    an illuminator for emitting illumination light of greater and lesser intensity toward the indicia;
    a diffuser for diffusing the illumination light en route to the indicia, the diffuser including a plurality of diffusing elements adjacent the illuminator; and
    wherein the diffuser includes a frustoconical portion having an exterior surface, and wherein the diffusing elements are integral with the diffuser and are raised relative to the exterior surface.

9. An arrangement for uniformly illuminating indicia to be imaged and electro-optically read, comprising:
    a solid-state imager having an optical axis, for capturing light over a field of view from the indicia;
    an illuminator for emitting illumination light of greater and lesser intensity toward the indicia;
    a diffuser for diffusing the illumination light en route to the indicia, the diffuser including a plurality of diffusing elements adjacent the illuminator; and
    wherein the diffuser includes a frustoconical portion on which the diffusing elements are mounted.

10. A method of uniformly illuminating indicia to be imaged and electro-optically read, comprising the steps of:
    emitting illumination light, according to an intensity profile, toward the indicia with an illuminator; and
    diffusing the illumination light en route to the indicia with a plurality of diffusing elements adjacent the illuminator;
    capturing light over a field of view from the indicia with a solid-state imager having an optical axis, and configuring the illuminator as a plurality of illumination light sources; and spacing the illumination light sources apart from one another; and
    configuring each diffusing element made of diffusing material with an elongated shape and an end face, and positioning each end face adjacent a respective illumination light source.

11. The method of claim 10, arranging the illumination light sources symmetrically about the optical axis.

12. The method of claim 10, and configuring each diffusing element with a thickness that decreases in size in a direction away from the end face of a respective diffusing element toward the indicia.

13. The method of claim 10, and surrounding the illuminator with a light baffle for reflecting the illumination light of lesser intensity from the illuminator.

14. The method of claim 10, and emitting auxiliary illumination light with an auxiliary illuminator; and guiding the auxiliary illumination light away from the auxiliary illuminator through a plurality of lightpipes having diffusing end faces for diffusing the auxiliary illumination light en route to the indicia.

15. The method of claim 10, wherein the diffusing step is performed by texturing surfaces with an increased density in regions closer to the illuminator for scattering the illumination light.

16. The method of claim 10, and receiving a reflective workpiece having a direct part marking (DPM) thereon as the indicia in a locating recess, and extending projections past the workpiece to reflect the illumination light reflected off the diffusing elements and serve as a background contrast for the DPM.

* * * * *

UNITED STATES PATENT AND TRADEMARK OFFICE
CERTIFICATE OF CORRECTION

| | |
|---|---|
| PATENT NO. | : 8,028,913 B2 |
| APPLICATION NO. | : 11/906092 |
| DATED | : October 4, 2011 |
| INVENTOR(S) | : Liu et al. |

It is certified that error appears in the above-identified patent and that said Letters Patent is hereby corrected as shown below:

Title Page, Item (74), under "Attorney, Agent, or Firm", in Column 2, Line 1, delete "Nonggiang" and insert -- Nongqiang --, therefor.

Signed and Sealed this
Eighth Day of January, 2013

David J. Kappos
*Director of the United States Patent and Trademark Office*